May 15, 1962 P. J. BERTOGLIO ETAL 3,034,674
MATERIAL HANDLING LOADING AND TRANSPORTING APPARATUS
Filed Nov. 14, 1960 4 Sheets-Sheet 3

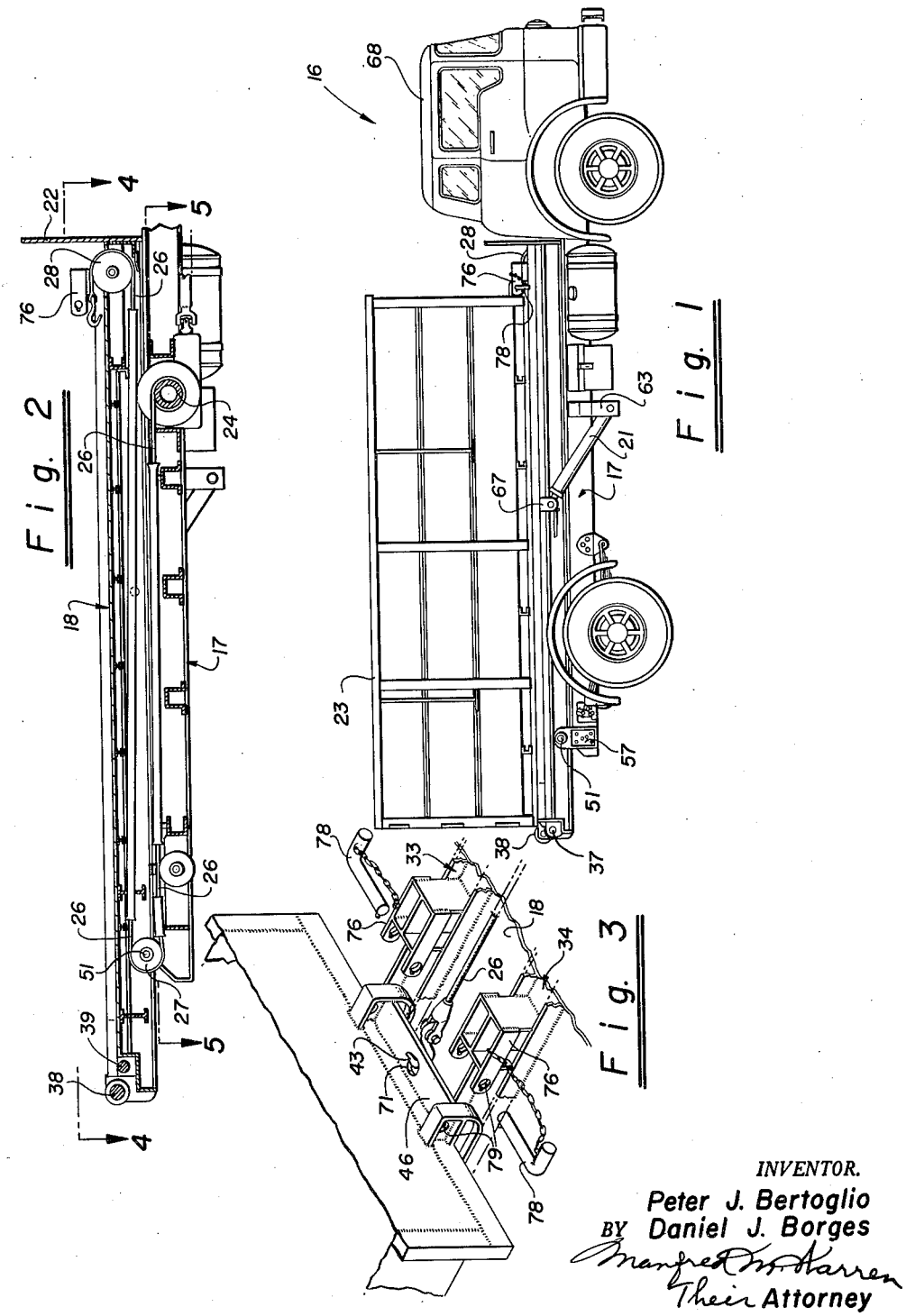

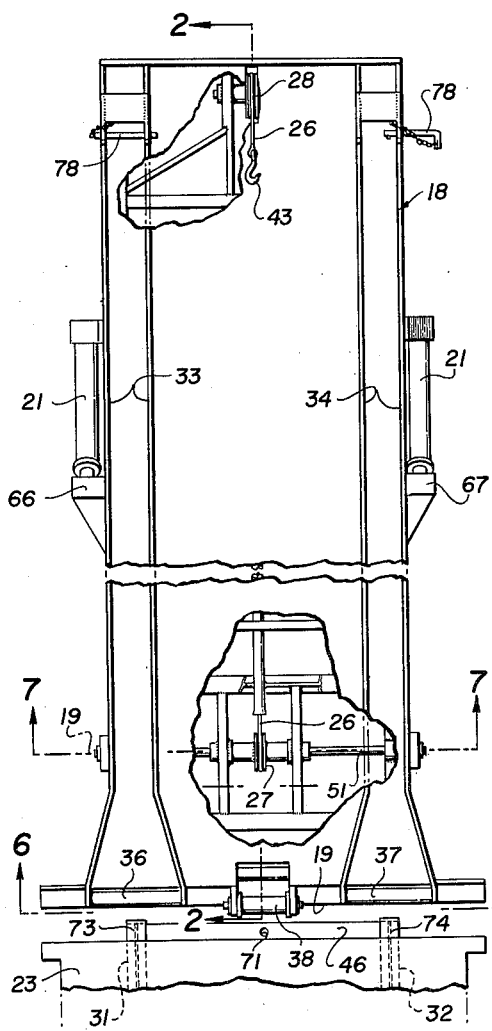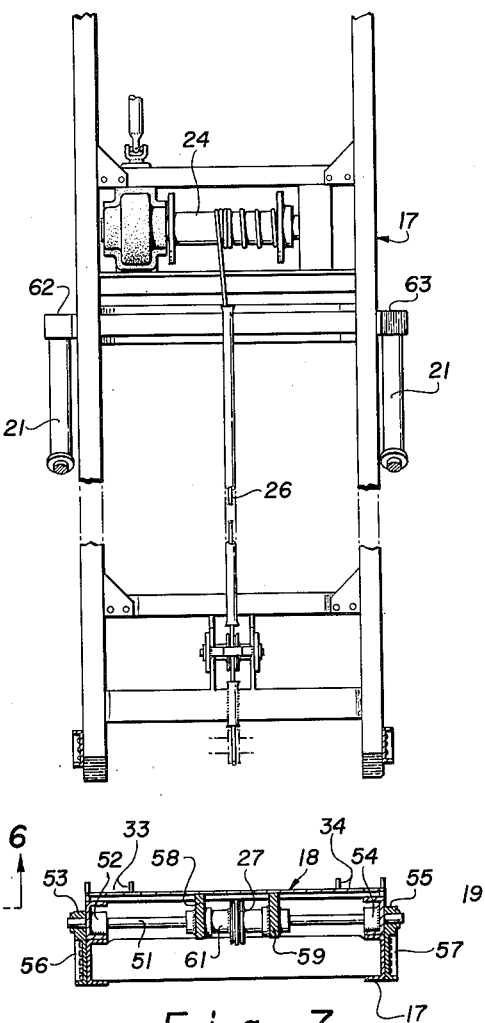

INVENTOR.
Peter J. Bertoglio
BY Daniel J. Borges
Their Attorney

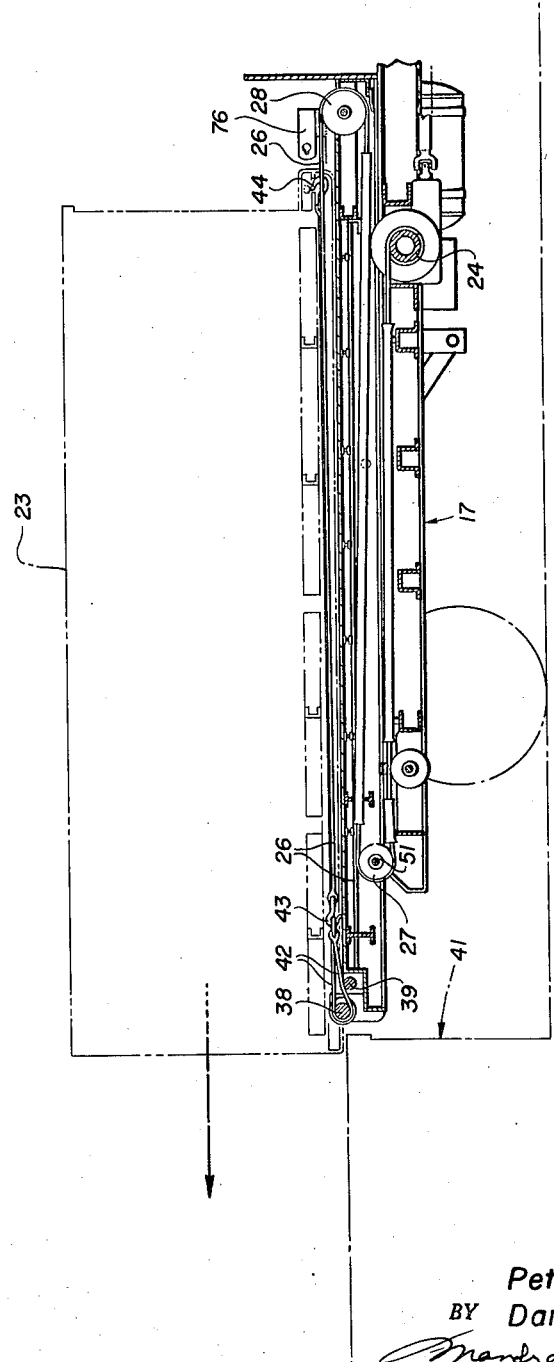

… …

United States Patent Office 3,034,674
Patented May 15, 1962

3,034,674
MATERIAL HANDLING LOADING AND
TRANSPORTING APPARATUS
Peter J. Bertoglio, Pittsburg, and Daniel J. Borges, Concord, Calif., assignors to Contra Costa Waste Service, Inc., a corporation of California
Filed Nov. 14, 1960, Ser. No. 68,705
4 Claims. (Cl. 214—517)

The invention relates to automotive trucks and demountable bodies therefor and to power-driven means for transferring such bodies to and from the truck chassis and the ground and/or loading docks and the like.

An object of the present invention is to provide a material handling and loading and transporting apparatus of the character described in which the movement of the loaded and unloaded bodies onto and from the truck chassis may be accomplished with ease and precision and under the complete and effective control of the operator.

Another object of the present invention is to provide a material handling, loading and transporting apparatus of the character above which combines the well-known advantages of a tilt-up bed dump truck and a demountable truck body and the ability in accordance with the present invention of moving a loaded body up an elevated truck bed as an inclined loading ramp with the operator able to accurately vary and control the pitch of the ramp during load and unloading of the body in accordance with the shifting center of gravity of the load, and to accomplish the foregoing without subjecting the truck bed raising and lowering structure to the stress of the large forces required to elevate and otherwise handle the loaded bodies on the inclined ramp.

A further object of the present invention is to provide an apparatus of the character described which may be used for transferring loaded and unloaded bodies horizontally between the truck bed and an adjacent loading ramp.

Still another object of the present invention is to provide an apparatus of the character above which is composed of a minimum number of sturdily formed parts capable of giving long and useful life.

The invention possesses other objects and features of advantage, some of which of the foregoing will be set forth in the following description of the preferred form of the invention which is illustrated in the drawings accompanying and forming part of this specification. It is to be understood however, that variations in the showing made by the said drawings and description may be adopted within the scope of the invention as set forth in the claims.

Referring to said drawings (four sheets):

FIGURE 1 is a side elevation of a truck and demountable body therefor constructed in accordance with the present invention.

FIGURE 2 is a longitudinal, sectional view taken through a portion of the truck chassis, the view being also referenced by the plane of line 2—2 of FIGURE 4.

FIGURE 3 is a fragmentary cross-sectional view on enlarged scale of a part of the apparatus.

FIGURE 4 is a plan view of the truck bed as suggested by the plane of line 4—4 of FIGURE 2, portions being cut away to disclose underlying parts.

FIGURE 5 is a plan view of the truck chassis taken substantially on the plane of line 5—5 of FIGURE 2.

FIGURE 6 is a rear end elevation of the truck bed as seen in FIGURE 4 and as suggested by the plane of line 6—6 of FIGURE 4.

FIGURE 7 is a cross-sectional view taken substantially on the plane of line 7—7 of FIGURE 4.

FIGURE 11 is a longitudinal sectional view of the apparatus as arranged for horizontal transfer of the body to and from a loading dock.

Figure 9:
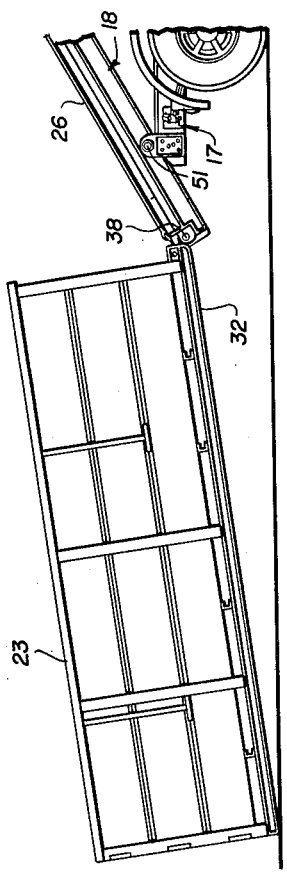
FIGURE 9 is a side elevation of the apparatus similar to FIGURE 8 but showing the parts in a further advanced position.
Figure 10:
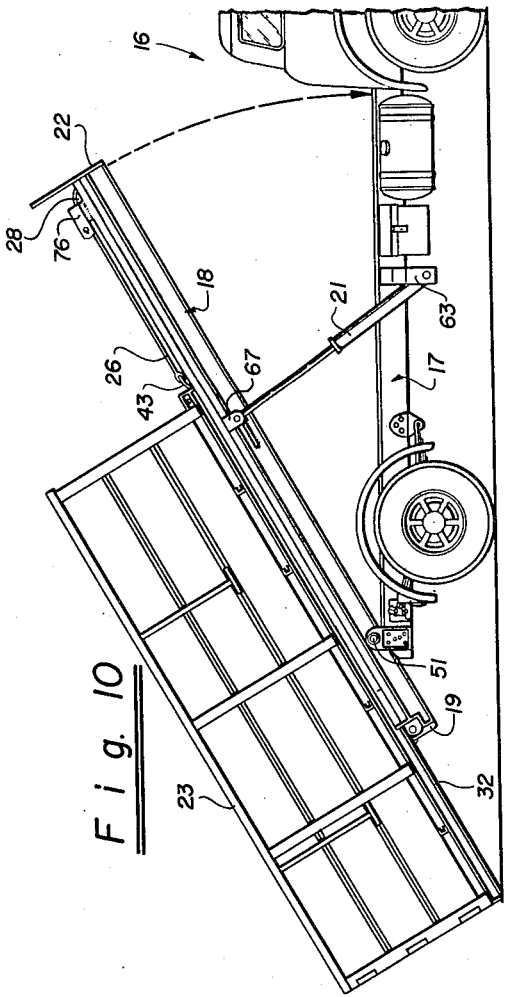
FIGURE 10 is a side elevation similar to FIGURES 8 and 9 but showing the parts in still further advanced position.

The material handling, loading and transporting apparatus of the present invention consists briefly of a truck 16 having a wheel supported truck chassis 17; a truck bed 18 which is pivotally connected to the chassis 17 for rotation about a transverse, horizontal axis 19, see FIGURES 4 and 7, adjacent the tail or rearward end 19 of the bed; power means 21 for raising and lowering of the forward end 22 of the bed about its pivotal axis 19; a demountable truck body 23; a power-driven winch 24, see FIGURES 2 and 5, carried by the chassis 17 and including a winch cable 26 connectible to the body 23 for raising of the body onto and for sliding the body into a supported position upon the bed 18; and a cable sheave 27 mounted for rotation about the pivotal axis 19 and supporting cable 26 for movement between the chassis 17 and bed 18 whereby the winch supported position, and all of such positions, of the body 23 on the bed 18 will remain fixed during the raising and lowering of the body relative to the chassis, thus giving the operator a most important element of control and precision and additionally freeing up the power means 21 from supporting the winch and cable load required for elevating the loaded truck body onto the bed. As will be understood, the mounting of sheave 27 concentric to the pivotal axis 19 permits the raising and lowering of the bed 18 without changing the distance between the load (body 23) and the winch 24 as such distance is measured along the length of the cable. Accordingly no relative "paying out" or "reeling in" of the cable is effected, and no longitudinal shifting of the body 23 on the bed 18 takes place, as the bed is raised or lowered about its pivotal axis 19.

As will be seen from FIGURES 1, 2 and 4, a second cable sheave 28 is carried by the bed 18 adjacent its forward end 22 and is journalled for rotation about a transverse horizontal axis parallel to axis 19; and cable 26 is extended from winch 24 to and around sheave 27 and thence along the underside of the bed longitudinally thereof to and around sheave 28 and to the upper side of the bed for connection to body 23. The provision of the two sheaves 27 and 28 and their location as above described places the large body lifting load directly upon the bed 18 which may be readily formed to resist this load in longitudinal compression, it being further noted that the load is similarly taken by the chassis 17 in longitudinal compression without any transfer of the load between the chassis and the bed, thereby permitting the free articulation of the bed 18 around its pivotal axis 19 in all positions of the loaded body 23 thereon. In other words the load as carried by the cable is supported by the bed 18 between sheave 28 and sheave 27 with the tensional force of the cable applied substantially in the longitudinal plane of the bed; and this cable tension is supported by the chassis between sheave 27 and winch 24 with the tensional force of the cable applied substantially in the longitudinal plane of the chassis frame.

Lifting of a loaded body onto the truck bed and its movement over the top surface of the bed is here facilitated by the provision on the body 23 of a pair of longitudinally extending skids 31 and 32 and the provision on the bed 18 of a pair of longitudinally extending guides 33 and 34 which are adapted to slidably receive the skids, and a pair of rollers 36 and 37 carried by the bed at the rearward end thereof aligned with the guides 36 and 37 and providing a rolling support for the skids on movement of the body onto and from the bed across the rear end of the bed. This operation is further facilitated by the provision of a roller 38, see FIGURES 4 and 6, at the rearward end of the bed medially between rollers 36 and 37 and in position for supporting cable 26 when lifting the body 23 onto the bed and when lowering the body therefrom, see FIGURES 8 and 9. Preferably, the guides 33 and 34 are widened out divergently toward the rear end 19 so as to receive and aid in centering of skids 31 and 32 where small, longitudinal misalignment between the truck and body may preliminarily exist.

The apparatus of the present invention is equally effective in transferring loaded and unloaded bodies 23 horizontally between the truck bed 18 and a loading dock 41. With reference to FIGURE 11 it will be seen that roller 38 is so positioned as to provide for a return cable loop extendible to the forward end of the bed for connection thereat to the forward end of the body or power removal of the body horizontally from the truck and onto the loading dock 41. In this arrangement cable 26 is extended from winch 24 around sheaves 27 and 28 as above explained, but instead of merely draping the cable over roller 38 as in the above described arrangement, the cable is looped around roller 38. An auxiliary roller 39 is here positioned just forwardly of the under side of roller 38 and preferably the cable is extended over roller 39 and around the under side and returned over the top of roller 38 so as to provide for a full rolling support for the cable in this hook-up. A separate cable extension piece 42 is also here used in this arrangement with one end of extension 42 connected to a hook 43 provided on the end of cable 27 and the opposite end of the extension being provided with a hook 44 engageable with a front base flange 46 on the box. In this arrangement the cables may run freely in the space provided beneath the box between the skids 31 and 32.

The aforesaid pivotal connection between the truck chassis and bed is here provided by a transverse shaft 51, see FIGURE 7, which is mounted at its opposite ends through aligned journals 52 and 53 provided by the chassis 17 and bed 18 at one side of the unit and by aligned journals 54 and 55 provided by the bed and chassis at the opposite side of the unit. The chassis journals 53 and 55 are carried by upstanding brackets 56 and 57 bolted or otherwise secured to the chassis rails so as to locate the pivotal axis 19 through the center of the bed 18 whereby the pivotal movement of the bed will be accomplished without movement of the bed at the pivotal axis and the strongest joint is obtained. Shaft 51 is also preferably supported adjacent the center of the bed by depending flanges 58 and 59 which also provide end supports for the bearing housing 61 for sheave 27 for journalling the latter on shaft 51 concentric to the pivotal axis 19.

The power means 21 for raising and lowering the bed 18 here consist of a pair of hydraulic cylinders secured at their lower ends to frame brackets 62 and 63 and having piston extensions connected to brackets 66 and 67 on the bed. The fluid pump and valve means for energizing the hydraulic units 21 is the same as that commonly used in the dump truck art and the controls therefor are located within the cab section 68 of the truck for convenient manual operation by the driver. A conventional transmission power takeoff may be used for driving the winch 24 and the controls for winch operation are likewise provided within the cab section 68 for convenient manual operation by the driver.

Figure 8:
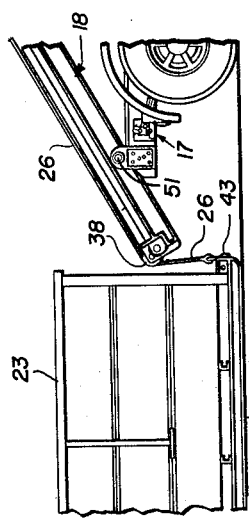
FIGURE 8 is a fragmentary side elevation showing a part of the truck and demountable body.

The loading and unloading operation of the apparatus is described in the following. Empty bodies 23 may be distributed around at construction sites, industrial plants and the like wherever material, either refuse or raw material or manufactured goods are to be collected and picked up. When the box is filled for transportation away from its site where loaded, a truck as above described is driven to the site and the rear end of the truck is backed into position adjacent the front end of the body and the bed is tilted up as illustrated in FIGURE 8. The cable is then payed out from the winch and extended over the rear lifting roller 38 and the end hook 43 engaged through an opening 71 in the base flange 46 at the front bottom of the body 23. With the brakes of the truck set, the operator starts to reel in cable 26, thus lifting the front end of the body onto the rear end of the inclined bed where the forward end of skids 31 and 32 find a rolling support on rollers 36 and 37 for movement into guides 33 and 34. The driver may then continue to reel in the cable while releasing the vehicle brakes so as to permit a simultaneous movement of the body 23 up the inclined bed and a backing of the vehicle under the progressively upwardly inclined body. When the weight of the body is completely transferred from the ground to the bed 18, the operator may start the descent of the bed by de-energizing the hydraulic cylinders 21 to thus lower the bed while simultaneously moving the body to its full forward position as illustrated in FIGURE 1. In such position, a pair of locking lugs 73 and 74 at the lower front of the body move into juxtaposition between locking flanges provided by brackets 76 on the bed and the body may be locked in place by a removable locking pin 78 which is engageable through aligned openings 79 in the lug and bracket flanges. The loaded truck may then be driven to the unloading point of the material. Unloading may be effected either by a dump truck type of evacuation of the contents or by removal of the body. The former result may be simply obtained by opening the rear end of the body 23 and elevating the bed to discharge the contents in a conventional dump truck fashion. To remove the body itself, the operator goes through a general reversal of operations above described. Locking pins 78 are removed. The bed 18 is elevated. The winch is operated to pay out cable thus permitting the body 23 to slide down the inclined bed until the rear end of the body rests on the ground. At this point the operator may release the vehicle brakes while continuing to pay out cable so as to permit the vehicle to move forwardly while the forward end of the body moves down the inclined ramp and over the rear end of the body. The operator may then continue to pay out cable so as to lower the front end of the body gently to the ground. As will be observed in both of the body pickup and unloading operations the handling of the body is precise and is accomplished with minimum strain of the vehicle parts and the position and operation are constantly under the exact control of the operator of the vehicle. In a similar fashion and as above described the body 23 may be moved horizontally off the bed and onto a loading platform or with equal facility a loaded or unloaded body may be drawn from a loading dock onto the truck bed.

We claim:

1. A material handling and loading and transporting apparatus comprising, a truck chassis, a truck bed pivotally connected to said chassis for rotatation about a transverse horizontal axis adjacent the rearward end of said bed between a generally flat horizontal position and a forwardly upwardly inclined elevated position, power means for raising and lowering said bed between said positions, a demountable truck body, a power driven winch carried by said chassis and including a winch cable connectible to said body for raising said body onto and for sliding said body longitudinally over said bed, a first cable sheave carried by said chassis and journalled for rotation about said pivotal axis, and a second cable sheave carried by said bed adjacent its forward end and journalled for rotation about a transverse horizontal axis parallel to said first-named axis, said cable extending from said winch to and around said first sheave and thence along the under side of said bed longitudinally thereof to and around said second sheave and to the upper side of said bed for connection to said body whereby the cable supported position of said body on said bed will remain constant on the bed during the raising and lowering of said bed and the force transmitted through the cable is carried by said bed and chassis independently of said bed raising and lowering means.

2. A material handling and loading and transporting apparatus as characterized in claim 1, wherein said body is provided with a pair of longitudinally extending skids, a pair of longitudinally extending guides on said bed adapted to slidably receive said skids, and a pair of rollers carried by said bed at the rearward end thereof aligned with said guides and providing a rolling support for said skids on movement of said body onto and from said bed across said rear end of said bed.

3. A material handling and loading and transporting apparatus as characterized in claim 2, and including a roller carried by said bed at said rearward end thereof medially of said first-named rollers and in position for supporting said cable when lifting said body onto said bed and when lowering said body therefrom.

4. A material handling and loading and transporting apparatus as characterized in claim 3 wherein said third roller is also positioned and may function to provide a return cable loop extendable to the forward end of said body for connection thereto for power removal of said body from said bed.

References Cited in the file of this patent

UNITED STATES PATENTS

| | | |
|---|---|---|
| 2,021,952 | Wren | Nov. 26, 1935 |
| 2,508,740 | Alvare | May 23, 1950 |
| 2,534,156 | Wyatt et al. | Dec. 12, 1950 |
| 2,789,715 | Filipoff | Apr. 23, 1957 |
| 2,867,339 | Nelson | Jan. 6, 1959 |